US009843241B2

(12) United States Patent
Yoshidomi et al.

(10) Patent No.: US 9,843,241 B2
(45) Date of Patent: Dec. 12, 2017

(54) MOTOR, MOTOR SYSTEM, AND MOTOR ENCODER

(71) Applicant: KABUSHIKI KAISHA YASKAWA DENKI, Kitakyushu-shi (JP)

(72) Inventors: Shirou Yoshidomi, Fukuoka (JP); Ikuma Murokita, Fukuoka (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 333 days.

(21) Appl. No.: 14/308,653

(22) Filed: Jun. 18, 2014

(65) Prior Publication Data
US 2014/0300254 A1 Oct. 9, 2014

Related U.S. Application Data

(63) Continuation of application No. PCT/JP2011/079729, filed on Dec. 21, 2011.

(51) Int. Cl.
*H02K 11/00* (2016.01)
*G01P 3/481* (2006.01)
*H02K 11/20* (2016.01)
*H02K 11/215* (2016.01)
*G01D 5/20* (2006.01)

(52) U.S. Cl.
CPC .......... *H02K 11/001* (2013.01); *G01P 3/4815* (2013.01); *H02K 11/20* (2016.01); *H02K 11/215* (2016.01); *G01D 5/2013* (2013.01)

(58) Field of Classification Search
CPC .... H02K 11/001; H02K 11/215; H02K 11/20; G01D 5/2013; G01P 3/4815
USPC ................... 310/68 B, 68 R; 318/400, 400.4

IPC ....................................................... H02K 11/00
See application file for complete search history.

(56) References Cited

U.S. PATENT DOCUMENTS

| 3,820,090 A | * | 6/1974 | Wiegand | G06K 7/083 |
| | | | | 148/120 |
| 5,148,106 A | * | 9/1992 | Ozawa | G01D 5/145 |
| | | | | 324/207.12 |
| 6,084,400 A | * | 7/2000 | Steinich | G01P 3/4815 |
| | | | | 324/207.13 |

(Continued)

FOREIGN PATENT DOCUMENTS

| CN | 102132126 | 7/2011 |
| DE | 10 2009 019 719 | 11/2010 |

(Continued)

OTHER PUBLICATIONS

"Wiegand effect", Wikipedia.com, Aug. 2016.*

(Continued)

Primary Examiner — John K Kim
(74) Attorney, Agent, or Firm — Mori & Ward, LLP

(57) ABSTRACT

A motor according to an embodiment includes a motor body, a rotating body, and a magnetic field sensor. The motor body rotates a shaft about the axis line thereof. The rotating body includes a permanent magnet and rotates along with the rotation of the shaft. The magnetic field sensor includes a magnet body having a large Barkhausen effect with the long direction thereof serving as the easy magnetization direction and is positioned to face the permanent magnet when the rotational position of the rotating body is at a given rotational position. The easy magnetization direction of the magnetic body is in a direction along a plane orthogonal to the rotation center line of the rotating body.

14 Claims, 10 Drawing Sheets

(56) References Cited

U.S. PATENT DOCUMENTS

| | | | | |
|---|---|---|---|---|
| 7,098,654 B2* | 8/2006 | Mehnert | ............... | G01P 3/487 324/207.24 |
| 2006/0056575 A1* | 3/2006 | Mehnert | ............... | G01P 3/487 377/89 |
| 2009/0039872 A1* | 2/2009 | Fischer | ............... | G01D 5/145 324/207.13 |
| 2011/0006757 A1* | 1/2011 | Mehnert | ............... | G01D 5/145 324/207.2 |
| 2014/0300254 A1* | 10/2014 | Yoshidomi | ............ | G01P 3/4815 310/68 B |

FOREIGN PATENT DOCUMENTS

| | | |
|---|---|---|
| EP | 0276402 | 8/1988 |
| EP | 0484716 | 5/1992 |
| JP | 59-052729 U | 4/1984 |
| JP | 09-308171 | 11/1997 |
| JP | 2000-161989 | 6/2000 |
| JP | 2001-033277 | 2/2001 |
| JP | 4622487 B2 | 6/2006 |
| JP | 2007-114032 | 5/2007 |
| JP | 2007-225536 | 9/2007 |
| JP | 2008-014799 | 1/2008 |
| JP | 2010-210287 | 9/2010 |
| JP | 2010-243153 | 10/2010 |
| JP | 2011-112539 | 6/2011 |

OTHER PUBLICATIONS

Arinaga, JP 2008-014799, IDS, English translation, 2008.*
Takahama, JP 2007-114032, IDS, English translation, 2007.*
English translation of Written Opinion for corresponding International Application No. PCT/JP2011/079729, dated Mar. 19, 2012.
Chinese Office Action for corresponding CN Application No. 201180075762.2, dated Jul. 13, 2016.
Japanese Office Action for corresponding JP Application No. 2013-550016, dated May 12, 2015.
International Search Report for corresponding International Application No. PCT/JP2011/079729, dated Mar. 19, 2012.
Written Opinion for corresponding International Application No. PCT/JP2011/079729, dated Mar. 19, 2012.
Extended European Search Report for corresponding EP Application No. 11877960.2-1558, dated Dec. 15, 2015.
Chinese Office Action for corresponding CN Application No. 201180075762.2, dated Dec. 25, 2015.
Japanese Office Action for corresponding JP Application No. 2013-550016, dated Nov. 1, 2016.
Chinese Office Action for corresponding CN Application No. 201180075762.2, dated Jan. 20, 2017.
Japanese Office Action for corresponding JP Patent No. 5880577, dated Jan. 30, 2017.

* cited by examiner

MOTOR, MOTOR SYSTEM, AND MOTOR ENCODER

CROSS-REFERENCE TO RELATED APPLICATIONS

This application is a continuation of PCT international application Ser. No. PCT/JP2011/079729 filed on Dec. 21, 2011 which designates the United States; the entire contents of which are incorporated herein by reference.

FIELD

The present invention relates to motors, motor systems, and motor encoders.

BACKGROUND

As an encoder used to detect the rotation of a motor, a conventional magnetic encoder provided with a magnetic field sensor is known. The magnetic encoder detects the rotation of the motor by detecting the magnetic field of a permanent magnet, which revolves along with the rotation of the motor, with the magnetic field sensor (see Japanese Patent No. 4622487, for example).

SUMMARY

A motor according to an aspect of embodiments includes a motor body, a rotating body, and a magnetic field sensor. The motor body rotates a shaft about an axis line thereof. The rotating body includes a permanent magnet and rotates along with the rotation of the shaft. The magnetic field sensor includes a magnetic body having a large Barkhausen effect with a long direction thereof serving as an easy magnetization direction and is positioned to face the permanent magnet when a rotational position of the rotating body is at a given rotational position. The easy magnetization direction of the magnetic body is in a direction along a plane orthogonal to a rotation center line of the rotating body.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

The following describes certain exemplary embodiments of a motor, a motor system, and a motor encoder disclosed in the present application in detail with reference to the accompanying drawings. The present invention is, however, not intended to be limited by the following embodiments.

First Embodiment

Figure 1:
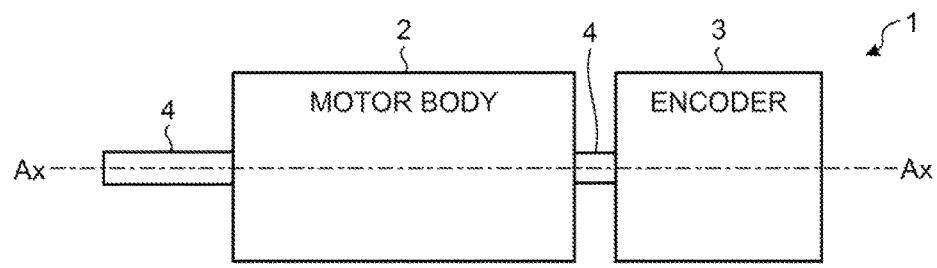
FIG. 1 is a diagram for explaining a motor according to a first embodiment.
Figure 1:
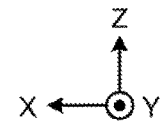

First, a motor according to a first embodiment will be described specifically with reference to the drawings. FIG. 1 is a diagram for explaining the motor in the first embodiment. In the following description, a motor encoder is described simply as an encoder. The direction of a loading device driven by the rotation of the motor (the negative direction on an X axis) may be described as a load side, and the opposite direction thereof (the positive direction on the X axis) may be described as an anti-load side.

As illustrated in FIG. 1, a motor 1 in the first embodiment includes a motor body 2 and an encoder 3. The motor body 2 includes a shaft 4 and rotates the shaft 4 about a rotation axis Ax, which is an axis line of the shaft 4, to output torque. The motor body 2 is not limited to be an electric motor that uses electricity as a power source, and the motor body 2 may be a motor that uses another power source, for example, a hydraulic motor, an air motor, and a steam motor.

The encoder 3 is coupled to the shaft 4 on the side opposite to the side of a loading device to which the torque of the motor body 2 is output, and detects the number of revolutions of the shaft 4.

Figure 2:
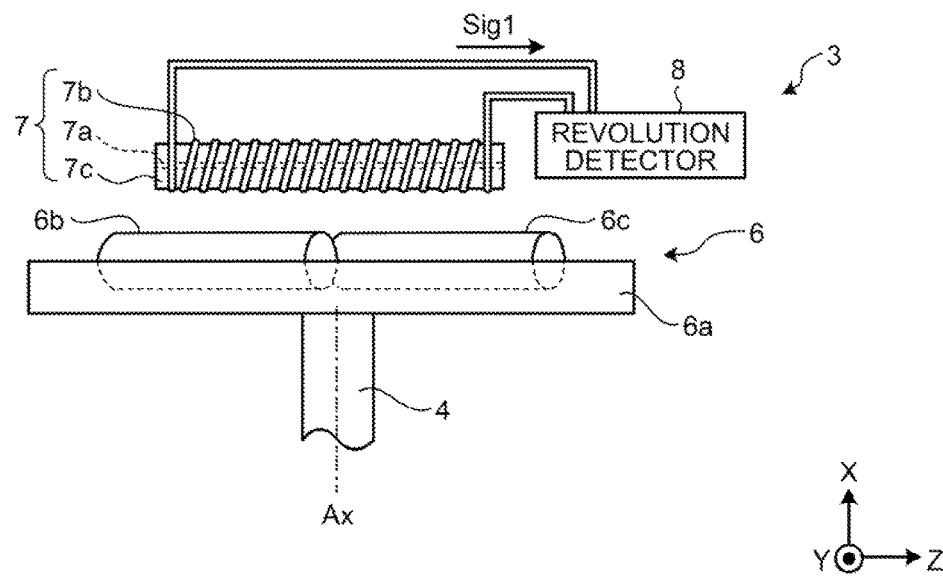
FIG. 2 is a diagram for explaining an encoder.
Figure 2:
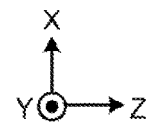

FIG. 2 is a diagram for explaining the encoder 3 in the first embodiment. As illustrated in FIG. 2, the encoder 3 includes a rotating body 6, a magnetic field sensor 7, and a revolution detector 8. The encoder 3 detects the number of revolutions of the motor body 2 by the revolution detector 8 processing a signal that is output from the magnetic field sensor 7 in response to the rotation of the motor body 2.

The rotating body 6 is coupled to the shaft 4 and rotates along with the rotation of the shaft 4. The rotating body 6 includes a base substrate 6a and permanent magnets 6b and 6c. The base substrate 6a is a disc-shaped member, and on the principal surface thereof on the anti-load side, formed are two pieces of recessed portions, each housing therein a part of the permanent magnet 6b or 6c. The permanent magnets 6b and 6c are housed in the respective recessed portions of the base substrate 6a, and are securely fixed to the recessed portions with, for example, adhesive.

The base substrate 6a is coupled to the shaft 4 in the central portion thereof and rotates about the rotation axis Ax as the rotation center. The base substrate 6a only needs to be capable of revolving the permanent magnets 6b and 6c about the rotation axis Ax, and is not limited to a disc-shaped member. For example, the base substrate 6a may be a polygonal plate member, or may be a member that includes arms, each holding one of the permanent magnets 6b and 6c.

The permanent magnets 6b and 6c are cylindrical permanent magnets with the long directions thereof serving as a magnetization direction, and magnetic poles different from each other are formed on both ends in the long direction. The long directions of the permanent magnets 6b and 6c are parallel to a direction orthogonal to the rotation axis Ax, and the magnets are disposed on the principal surface of the base substrate 6a.

Figure 3:
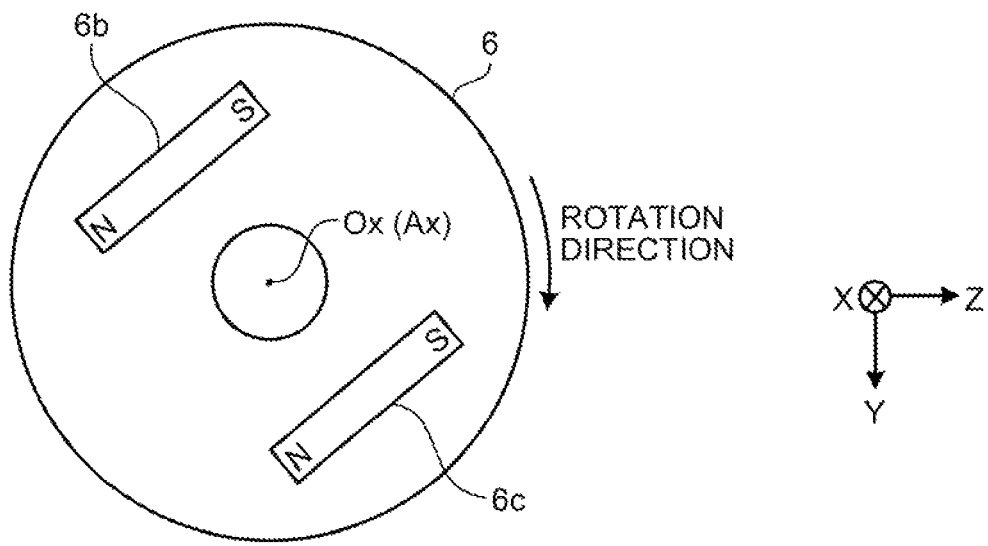
FIG. 3 is a diagram for explaining the arrangement of permanent magnets on a rotating body.

FIG. 3 is a diagram for explaining the arrangement of the permanent magnets 6b and 6c on the rotating body 6. As illustrated in FIG. 3, the permanent magnets 6b and 6c are disposed at positions shifted from a rotation center Ox of the base substrate 6a such that the two magnetic poles (N pole and S pole) are line-symmetric to each other with respect to a line orthogonally crossing the rotation axis Ax, and thus the N pole and the S pole on both ends are of comparable distance from the rotation center Ox.

The permanent magnets 6b and 6c are located at positions 180-degree rotation symmetric with the rotation center Ox as the center. Consequently, when the permanent magnet 6b is revolved by 180 degrees, the permanent magnet 6b is located at the position of the permanent magnet 6c before the rotation, and when the permanent magnet 6c is revolved by 180 degrees, the permanent magnet 6c is located at the position of the permanent magnet 6b before the rotation.

The permanent magnets 6b and 6c differ from each other in the direction of magnetic poles. For example, assuming that the direction of rotation is the direction indicated in FIG. 3, the rotational direction side of the permanent magnet 6b is the S pole and the rotational direction side of the permanent magnet 6c is the N pole. Consequently, a permanent magnet that alternates the S pole and the N pole for each 180-degree rotation is to emerge at a given position.

While the permanent magnets 6b and 6c are columnar with the long directions thereof serving as the direction of axis (see FIG. 2, for example), they are not limited to such a shape. For example, the permanent magnets 6b and 6c may be in a quadrangular prism shape with the long directions thereof serving as the direction of axis, or may be prismatic other than a quadrangular prism shape.

Referring back to FIG. 2, the description of the encoder 3 is continued. As illustrated in FIG. 2, the encoder 3 includes the magnetic field sensor 7 and the revolution detector 8. The magnetic field sensor 7 is magnetized in a first direction (the positive direction on a Z axis, for example) and outputs a pulse of positive polarity (hereinafter, described as a positive pulse) each time the permanent magnet 6b passes over the magnetic field sensor 7. The magnetic field sensor 7 is further magnetized in a second direction (the negative direction on the Z axis, for example) opposite to the first direction and outputs a pulse of negative polarity (hereinafter, described as a negative pulse) each time the permanent magnet 6c passes over the magnetic field sensor 7.

The revolution detector 8 counts the positive pulses output from the magnetic field sensor 7 and outputs the number of counts as the number of revolutions of the motor 1. In the following description, the permanent magnet that magnetizes the magnetic field sensor 7 in the first direction to output a positive pulse may be described as a set magnet, and the permanent magnet that magnetizes the magnetic field sensor 7 in the second direction to output a negative pulse may be described as a reset magnet.

The magnetic field sensor 7 includes a magnetic wire 7a and a detection coil 7b. The magnetic field sensor 7 utilizes a large Barkhausen effect to output a signal Sig1 that includes detection pulses such as positive pulses and negative pulses, and operates without the power supply being provided from the outside.

The magnetic wire (or magnetic body) 7a is a ferromagnetic wire that has different magnetic characteristics between the central portion and the circumferential portion thereof, and has a large Barkhausen effect. A large Barkhausen effect is a property in which magnetic domain walls inside a magnetic body are displaced at one time when the magnetic body is magnetized. The magnetic wire 7a is formed, for example, by wiredrawing an amorphous magnetic material, the basic composition of which is a Fe—Co—Si or Co—FeNi system, and then by exerting a torsion stress thereon. The easy magnetization direction of the magnetic wire 7a is the drawing direction of the magnetic wire 7a.

The magnetic wire 7a is molded with a resin member 7c of a nonmagnetic material, and around the molded magnetic wire 7a, the detection coil 7b is wound. When the magnetic domain walls inside the magnetic body are displaced at one time in the magnetic wire 7a, an induced electromotive force is generated in the detection coil 7b and a pulse signal is output from the detection coil 7b. The magnetic field sensor 7 may, however, be structured without using the resin member 7c.

As illustrated in FIG. 2, the magnetic field sensor 7 is disposed along a plane orthogonal to the rotation center line of the rotating body 6 that is orthogonal to the rotation axis Ax. Specifically, the magnetic field sensor 7 is disposed to face the principal surface of the base substrate 6a such that the long direction of the magnetic field sensor 7 is parallel to a direction orthogonal to the rotation axis Ax, and the drawing direction of the magnetic wire 7a is along the principal surface of the base substrate 6a. While the magnetic field sensor 7 in the long direction and the magnetic wire 7a in the long direction are of the same length as illustrated in FIG. 2, the magnetic field sensor 7 is not limited to such a configuration. For example, the magnetic field sensor 7 in the long direction may be longer than the magnetic wire 7a in the long direction. Furthermore, while the magnetic wire 7a is exemplified to be disposed at the center of the detection coil 7b in FIG. 2, the position of the magnetic wire 7a is not limited to the example illustrated in FIG. 2 and the magnetic wire 7a may be disposed at a position off-center within the detection coil 7b.

Figure 4:
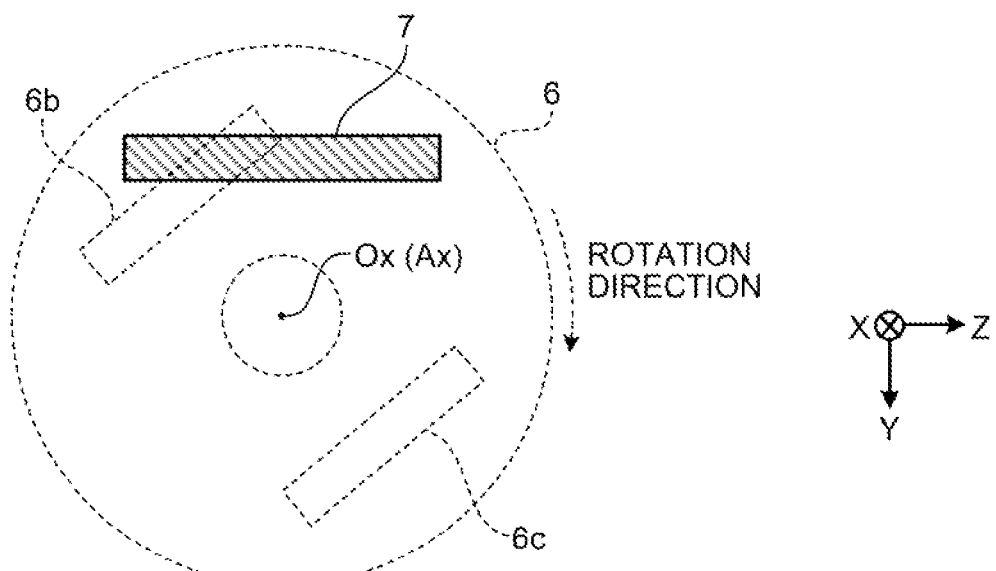
FIG. 4 is a diagram for explaining the positional relation of a magnetic field sensor with respect to the rotating body.

FIG. 4 is a diagram for explaining the positional relation of the magnetic field sensor 7 with respect to the rotating body 6. As illustrated in FIG. 4, the magnetic field sensor 7 is located at a position shifted from the rotation center Ox of the rotating body 6 as viewed from the direction of the rotation axis Ax. Furthermore, the magnetic field sensor 7 is disposed such that the magnetic wire 7a is line-symmetric with respect to a line orthogonally crossing the rotation axis Ax, and the middle of the magnetic wire 7a in the long direction is closest to the rotation axis Ax and the both ends thereof in the long direction are of comparable distance from the rotation axis Ax.

The magnetic field sensor 7 and the permanent magnets 6b and 6c are disposed at positions in which the distances of the respective middles in the long direction from the rotation axis Ax are comparable with one another. Consequently, the magnetic field sensor 7 is repeatedly positioned at the position to face the permanent magnet 6b or 6c when the rotating body 6 rotates about the rotation axis Ax.

Figure 5:
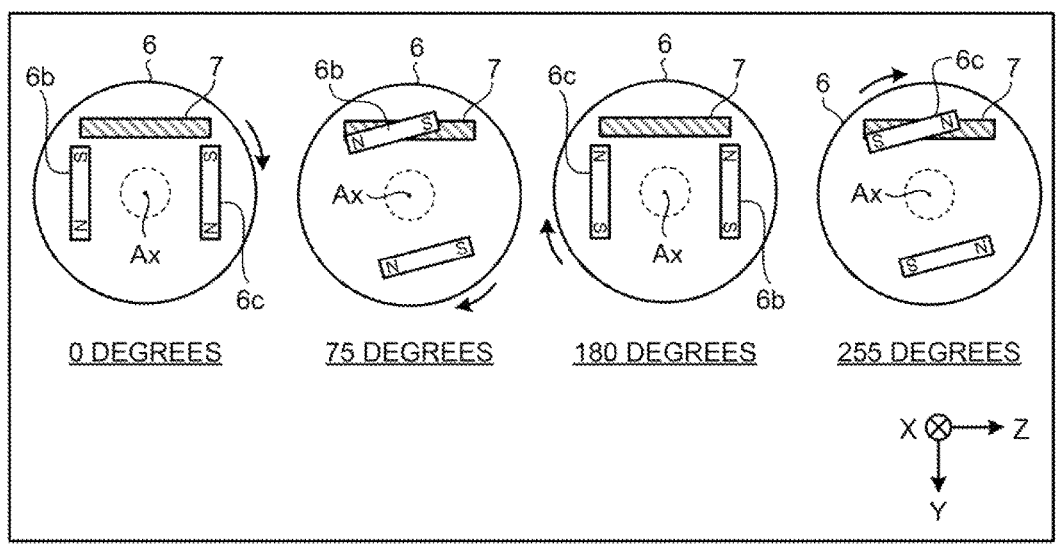
FIG. 5 is a diagram illustrating the positional relation of the magnetic field sensor with respect to the permanent magnets.

FIG. 5 is a diagram illustrating the positional relation of the magnetic field sensor 7 with respect to the permanent magnets 6b and 6c, indicating the situations of the rotating body 6 being rotated by 75 degrees, 180 degrees, and 255 degrees from a given rotational position (0 degrees). It is assumed that, when the angle of the easy magnetization direction of the magnetic field sensor 7 with respect to the magnetization direction of the permanent magnet 6b or 6c reaches 15 degrees as viewed from the direction of the rotation axis Ax, the magnetization reversal occurs in which the magnetic domain walls of the magnetic field sensor 7 are displaced at one time, as one example.

As illustrated in FIG. 5, when the rotating body 6 rotates about the rotation axis Ax by 75 degrees from the given rotational position (0 degrees), the angle between the long direction of the permanent magnet 6b that is the set magnet and the long direction of the magnetic field sensor 7 reaches 15 degrees as viewed from the direction of the rotation axis Ax. The long direction of the permanent magnet 6b is the magnetization direction of the permanent magnet 6b, and the long direction of the magnetic field sensor 7 is the easy magnetization direction of the magnetic field sensor 7. Consequently, the magnetic field sensor 7 is magnetized by the permanent magnet 6b such that the magnetization direction from the S pole to the N pole is in the positive direction on the Z axis, and is turned into a set state.

When the rotating body 6 subsequently comes to the rotational position of 255 degrees, the angle between the long direction of the permanent magnet 6c that is the reset magnet and the long direction of the magnetic field sensor 7 reaches 15 degrees as viewed from the direction of the rotation axis Ax. The long direction of the permanent magnet 6c is the magnetization direction of the permanent magnet 6c. The positions of the S pole and the N pole of the permanent magnet 6b and those of the permanent magnet 6c are opposite at the position to face the magnetic field sensor 7. Consequently, the magnetic field sensor 7 is magnetized by the permanent magnet 6c such that the magnetization direction from the S pole to the N pole is in the negative direction on the Z axis, and is turned into a reset state.

As in the foregoing, the magnetization direction of the magnetic field sensor 7 by the permanent magnet 6b differs from that of the magnetic field sensor 7 by the permanent magnet 6c, and thus the directions of current that flows through the detection coil 7b are in reverse polarity. The winding direction of the detection coil 7b is so set that a positive pulse is output when the magnetic wire 7a is magnetized by the permanent magnet 6b and a negative pulse is output when the magnetic wire 7a is magnetized by the permanent magnet 6c.

Figure 6:
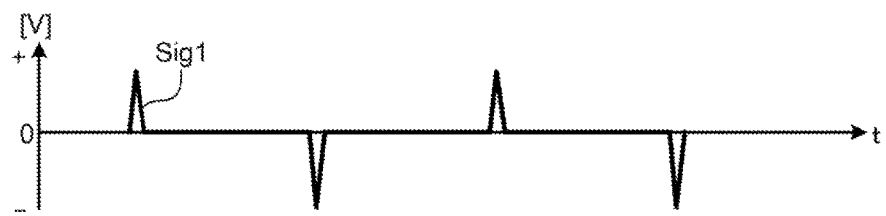
FIG. 6 is a chart for explaining a signal output from the magnetic field sensor.

The magnetic field sensor 7 thus outputs positive pulses and negative pulses alternately and repeatedly as illustrated in FIG. 6 when the rotating body 6 rotates in a given direction continuously. FIG. 6 is a chart for explaining a signal output from the magnetic field sensor 7. When the magnetic field sensor 7 is once in a set state, the magnetization direction thereof is unchanged and thus no abrupt magnetization reversal appears until the magnetic field sensor 7 is turned into a reset state. Consequently, while the magnetic field sensor 7 is in a set state, a positive pulse is not output even when the magnetic field sensor 7 comes to a range of 15 degrees again with respect to the permanent magnet 6b that is the set magnet.

Referring back to FIG. 2, the description of the encoder 3 is continued. The revolution detector 8 detects the number of revolutions of the rotating body 6, more specifically, the number of revolutions of the shaft 4 based on the signal Sig1 output from the magnetic field sensor 7. The revolution detector 8 is capable of holding the number of revolutions of the rotating body 6 even when a power-supply voltage Vcc is not provided from the outside. Disposing the revolution detector 8 adjacent to the magnetic field sensor 7 reduces the power required to count and hold the number of revolutions of the rotating body 6.

Figure 7:
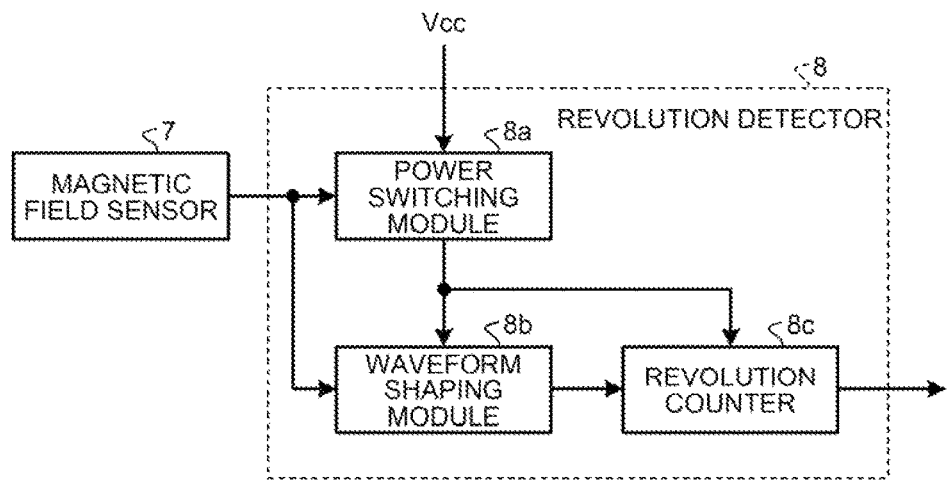
FIG. 7 is a block diagram for explaining a revolution detector.

FIG. 7 is a block diagram for explaining the revolution detector 8. As illustrated in FIG. 7, the revolution detector 8 includes a power switching module 8a, a waveform shaping module 8b, and a revolution counter 8c, and is capable of detecting the number of revolutions of the rotating body 6 even when the power supply is not provided from the outside. The revolution detector 8 counts the number of positive pulses in the signal Sig1 output from the magnetic field sensor 7 and outputs the number of counts as the number of revolutions of the rotating body 6.

The power switching module 8a supplies the power-supply voltage Vcc to the waveform shaping module 8b and the revolution counter 8c when the power-supply voltage Vcc is supplied from the outside. In contrast, when the power-supply voltage Vcc is not supplied from the outside, the power switching module 8a supplies a voltage generated from the positive pulses output from the magnetic field sensor 7 to the waveform shaping module 8b and the revolution counter 8c. While the negative pulses output from the magnetic field sensor 7 are in negative polarity and are not used for voltage generation, the negative pulses can be used for voltage generation with a full-wave rectifier or the like.

The waveform shaping module 8b converts the positive pulses output from the magnetic field sensor 7 into square-wave pulses, and outputs the square-wave pulses to the revolution counter 8c. The revolution counter 8c counts the number of pulses output from the waveform shaping module 8b and outputs the number of counts to the outside. The revolution counter 8c is provided with a storage that stores therein the number of pulses counted, and is configured to allow the number of pulses counted to be stored in the storage even when the power-supply voltage Vcc from the outside is not supplied to the revolution detector 8.

As in the foregoing, in the motor 1 in the first embodiment, the magnetic field sensor 7 that includes the magnetic body of a large Barkhausen effect is disposed in the encoder 3. Consequently, even when the shaft 4 of the motor 1 rotates while the power-supply voltage Vcc is not supplied, for example, the number of revolutions of the shaft 4 can be detected by the encoder 3. Moreover, because it is the position detection by the magnetic body, as compared with the position detection by optical detection, the power consumption can be reduced.

In the encoder 3, the magnetic field sensor 7 and the permanent magnets 6b and 6c are disposed being spaced with respect to the rotation axis Ax that is the center line of revolution. When the rotational position of the rotating body 6 is at given rotational positions, the magnetic field sensor 7 is positioned to face the permanent magnets 6b and 6c. Furthermore, the magnetization directions of the permanent magnets 6b and 6c and the easy magnetization direction of the magnetic field sensor 7 are in the direction along a plane orthogonal to the rotation axis Ax. Consequently, even when leakage flux from the motor body 2 and others is present, for example, a malfunction due to such leakage flux can be prevented.

Now, one example of leakage flux from the motor body 2 that is an electric motor will be explained. Even when the motor body 2 is not an electric motor, the leakage flux attributable to electromagnetism used for, for example, the control of brakes and power sources is present, and thus the malfunction of the encoder 3 due to such leakage flux can be prevented.

Figure 8:
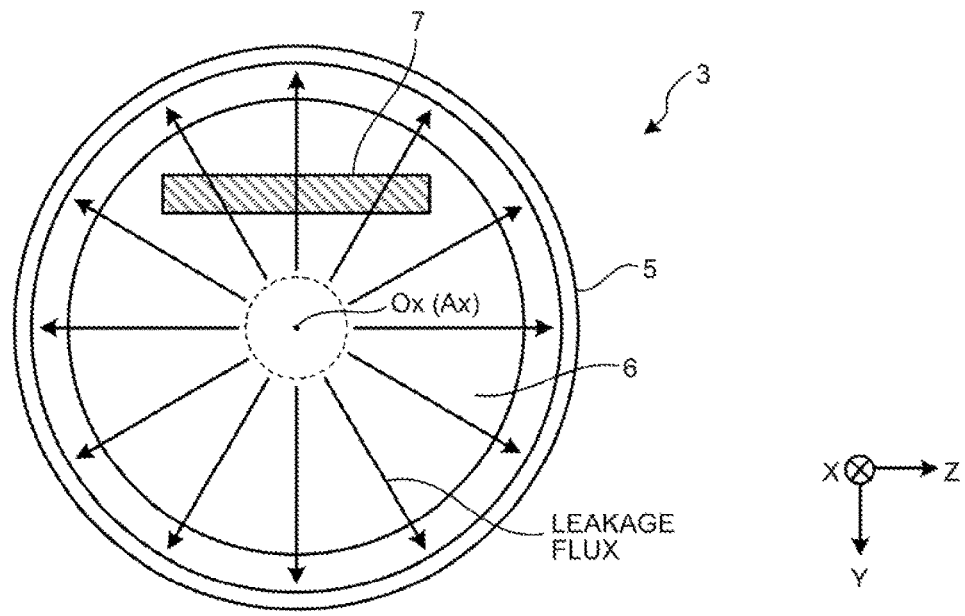
FIG. 8 is a diagram for explaining leakage flux from a motor body.

FIG. 8 is a diagram for explaining one example of the leakage flux from the motor body 2. In FIG. 8, to make the explanation easier to understand, only a part of the configuration is illustrated and the other part thereof is omitted. In the encoder 3, for the purpose of improving magnetic noise resistance and others, a back yoke 5 made of metal, for example, is disposed. The back yoke 5 can form an escape route for unnecessary magnetic flux. While the back yoke 5 of a cylindrical shape arranged to surround the peripheries of the rotating body 6 and the magnetic field sensor 7 is exemplified here, the shape and the arrangement of the back yoke 5 are not limited to these.

As illustrated in FIG. 8, when the cylindrical back yoke 5 is arranged in the encoder 3, the leakage flux from the motor body 2 propagates radially from the end of the shaft 4 to the back yoke 5, and thus the leakage flux passes through the magnetic field sensor 7. The directions of the leakage flux from the shaft 4 are, however, skewed with respect to the easy magnetization direction of the magnetic field sensor 7, and thus the magnetic field sensor 7 is insusceptible to the leakage flux from the shaft 4. Consequently, the distance between the magnetic field sensor 7 and the motor body 2 can be made small, for example, whereby the downsizing of the encoder 3 and the motor 1 can be achieved. While the example of the back yoke 5 being arranged has been described, even when no back yoke 5 is arranged or even when a back yoke formed of resin material is arranged, the leakage flux from the motor body 2 may, for example, expand radially from the end of the shaft 4 and may pass through the magnetic field sensor 7. As a consequence, even when no metallic back yoke 5 is arranged, for example, the malfunction of the encoder 3 due to the leakage flux from the motor body 2 can be prevented.

Furthermore, the magnetic field sensor 7 is disposed such that the magnetic wire 7a is line-symmetric with respect to a line orthogonally crossing the rotation axis Ax and the both ends of the magnetic wire 7a in the long direction are of comparable distance from the rotation axis Ax. Consequently, the directions of the leakage flux from the shaft 4 are symmetric on both sides of the magnetic field sensor 7 with the middle portion thereof serving as the center. This makes the magnetic field sensor 7 further insusceptible to the leakage flux from the motor body 2, and thus further downsizing of the encoder 3 and the motor 1 can be achieved.

In the encoder 3, the long directions of the permanent magnets 6b and 6c are defined as the magnetization direction, and the long direction of the magnetic field sensor 7 is defined as the easy magnetization direction. The long directions of the permanent magnets 6b and 6c and the long direction of the magnetic field sensor 7 are thus disposed along a plane orthogonal to the rotation axis Ax. Consequently, the short directions of the permanent magnets 6b and 6c and the short direction of the magnetic field sensor 7 are in the direction of the rotation axis Ax, and thus the length of the encoder 3 in the direction of the rotation axis Ax can be reduced. This can also achieve the downsizing of the encoder 3 and the motor 1.

Providing the magnetic field sensor 7 makes MR elements and Hall elements unnecessary to be mounted on a circuit board for the detection of multiple revolutions. This makes it unnecessary to secure the mounting space thereof on the circuit board, whereby the space of the circuit board can be saved and the degree of freedom in design can be enhanced.

Figure 9:
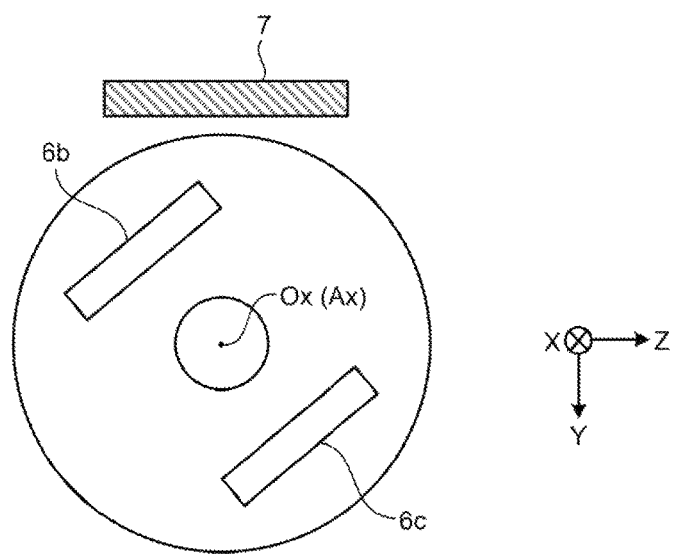
FIG. 9 is a diagram illustrating another example of the arrangement of the magnetic field sensor.

While the permanent magnets 6b and 6c and the magnetic field sensor 7 are faced to each other in the direction of the rotation axis Ax in the first embodiment, they are not limited to such a positional relation. For example, as illustrated in FIG. 9, the magnetic field sensor 7 can be disposed in the direction orthogonal to the rotation axis Ax with respect to the permanent magnets 6b and 6c. FIG. 9 is a diagram illustrating another example of the arrangement of the magnetic field sensor 7. When the magnetic field sensor 7 is faced to the permanent magnets 6b and 6c in the direction of the rotation axis Ax, as compared with when the magnetic field sensor 7 is disposed in the direction orthogonal to the rotation axis Ax with respect to the permanent magnets 6b and 6c, the permanent magnets 6b and 6c and the magnetic field sensor 7 can be brought closer.

In the first embodiment, one example of the configuration of the encoder 3 has been exemplified. However, there are a number of variations in the configuration of the encoder. Thus, in the following embodiments, the other examples will be exemplified.

Second Embodiment

The following describes a motor according to a second embodiment. In the following description, a motor system that includes a control device will be explained.

Figure 10:
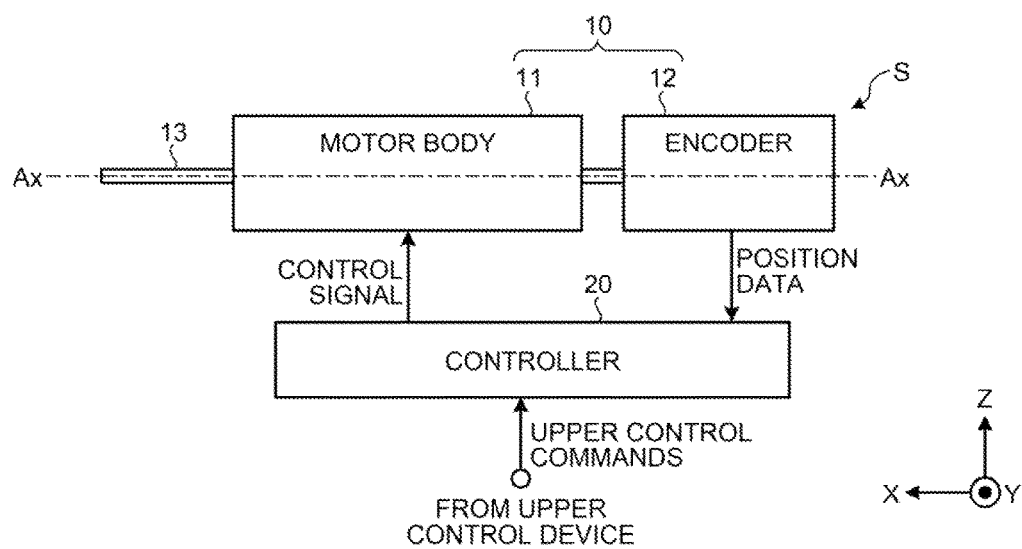
FIG. 10 is a diagram for explaining a motor system according to a second embodiment.

With reference to FIG. 10, the configuration of the motor system in the second embodiment will be described first. FIG. 10 is a diagram for explaining the motor system in the second embodiment.

As illustrated in FIG. 10, a motor system S in the second embodiment includes a motor 10 and a controller 20. The motor 10 includes a motor body 11 and an encoder 12.

The motor body 11 is one example of a power generation source, not including the encoder 12. The motor body 11 includes a shaft 13 and rotates the shaft 13 about the rotation axis Ax, which is an axis line of the shaft 13, to output torque. The motor body 11 is not limited to be an electric motor that uses electricity as a power source as with the motor body 2 in the first embodiment, and the motor body 11 may be a motor that uses another power source, for example, a hydraulic motor, an air motor, and a steam motor.

The encoder 12 is coupled to the shaft 13 on the side opposite to the side of a loading device to which the torque of the motor body 11 is output. The encoder 12 detects the rotation angle and the number of revolutions of the shaft 13 to detect a rotation amount x of the motor body 11, and outputs position data that represents the rotation amount x. While the encoder 12 can detect at least one of rotating velocity v of the motor body 11 and rotational acceleration a of the motor body 11 in addition to the rotation amount x of the motor body 11, for the convenience of explanation, the physical quantity that the encoder 12 detects is explained as the rotation amount x in the following description.

The controller 20 acquires upper control commands from a not-depicted upper controller, and controls the motor body 11 in response to the upper control commands. The controller 20 acquires position data output from the encoder 12, and based on the position data, controls the rotation of the motor body 11 such that the rotation of the motor body 11 is as the rotation corresponding to the upper control commands. In the second embodiment in which an electric motor is used as the motor body 11, the controller 20 controls current or voltage to apply to the motor body 11 based on the position data so as to control the rotation of the motor body 11. When the motor body 11 uses other power sources such as hydraulic, air, and steam pressure, controlling the supply of those power sources can control the rotation of the motor body 11.

Figure 11:
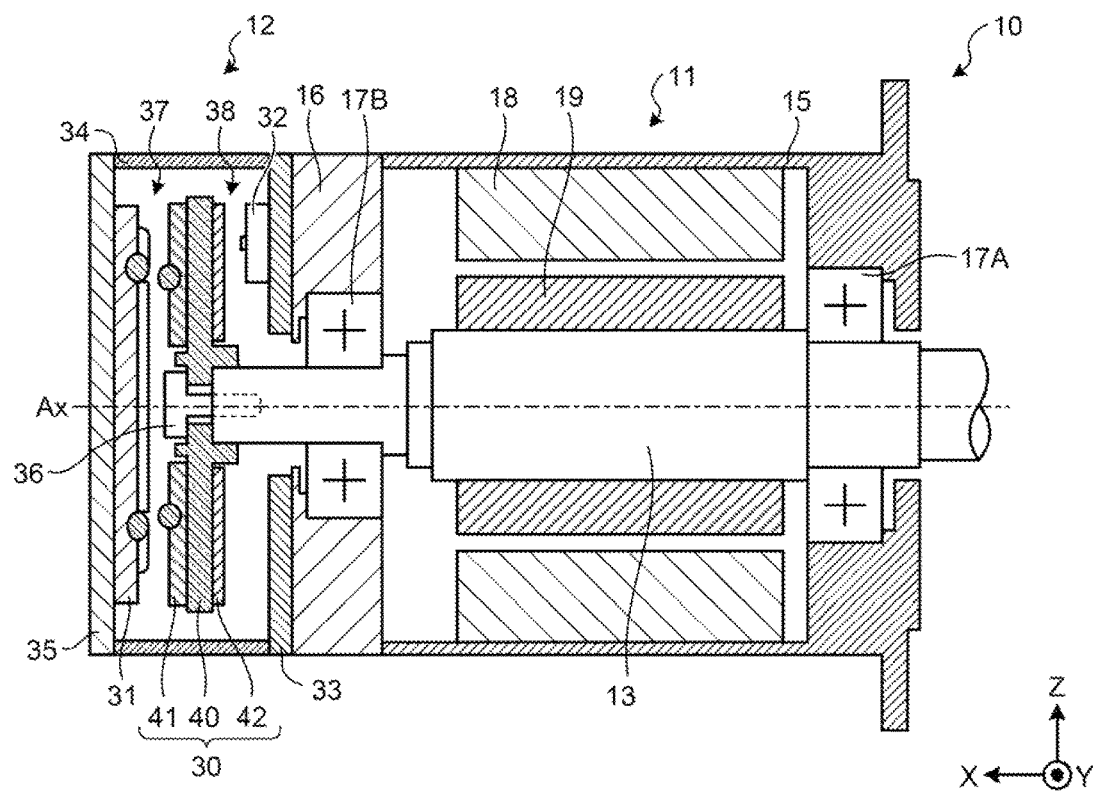
FIG. 11 is a diagram for explaining a motor in the second embodiment.

With reference to FIG. 11, the following describes the configuration of the motor 10 in the second embodiment. FIG. 11 is a diagram for explaining the motor 10 in the second embodiment.

As illustrated in FIG. 11, the motor 10 in the second embodiment includes the motor body 11 and the encoder 12, and the encoder 12 is attached on the anti-load side of the motor body 11. The motor body 11 includes the shaft 13, a frame 15, a bracket 16, bearings 17A and 17B, a stator 18, and a rotor 19.

The frame 15 is formed in a cylindrical shape, and on the inner circumferential surface thereof, the outer circumference of the stator 18 is securely fixed and the bearing 17A is held on one end side. The bracket 16 is formed in a roughly disc shape, and the outer circumferential portion thereof is attached to the other end side of the frame 15 while the inner circumferential portion holds the bearing 17B. By the bearings 17A and 17B, the shaft 13 is rotatably held such that the axis line of the shaft 13 is positioned on the rotation axis Ax.

The stator 18 includes a stator core and stator windings, and is fixed to the frame 15. On the inner circumferential side of the stator 18, the rotor 19 is arranged to face via a space, and by passing an electric current through the stator windings of the stator 18, a rotating magnetic field is generated inside the stator 18. The rotor 19 includes a rotor core and a plurality of permanent magnets, and by the interaction between the rotating magnetic field generated inside the stator 18 and the magnetic fields that the permanent magnets of the rotor 19 generate, the rotor 19 rotates. Along with the rotation of the rotor 19, the shaft 13 rotates about the rotation axis Ax.

The encoder 12 includes a rotating body 30, a magnetism detection unit 31, and an optical detection unit 32, and detects the revolution and the rotational position of the shaft 13. Based on the detection results, the encoder 12 generates and outputs the position data.

The encoder 12 further includes a base portion 33, a back yoke 34, and a lid member 35. The base portion 33 has a through hole into which the shaft 13 is inserted in the central portion thereof, and the load side thereof is attached to the bracket 16. On the anti-load side of the base portion 33, the optical detection unit 32 is attached. The back yoke 34 is a cylindrical member made of magnetic material such as metal arranged to surround the peripheries of the rotating body 30, the magnetism detection unit 31, and the optical detection unit 32, and one end thereof is attached to the outer circumferential portion of the base portion 33 on the anti-load side. By the back yoke 34, the improvement in the magnetic noise resistance of the encoder 12 is achieved. While the example of the metallic back yoke 34 being arranged has been described, as with the motor 1 in the first embodiment, even when the back yoke 34 is not arranged, the leakage flux from the end of the shaft 13 expands radially from the end of the shaft 13, and thus the leakage flux from the motor body 11 passes over magnetic field sensors 54a to 54c, for example. Consequently, even when no metallic back yoke 34 is arranged, for example, the malfunction of the encoder 12 due to the leakage flux from the motor body 11 can be prevented.

On the other end of the back yoke 34, the lid member 35 is attached, and in a space formed by the base portion 33, the back yoke 34, and the lid member 35, disposed are the rotating body 30, the magnetism detection unit 31, and the optical detection unit 32.

The rotating body 30 includes a base substrate 40, a magnet unit 41, and a reflective disc 42, and is a member in a disc shape having a through hole in the central portion thereof. The base substrate 40 in the central portion thereof is fixed to the end of the shaft 13 with a bolt 36, and rotates along with the rotation of the shaft 13.

On the anti-load side of the base substrate 40, the magnet unit 41 is fixed, and on the load side of the lid member 35, the magnetism detection unit 31 is fixed. The magnet unit 41 and the magnetism detection unit 31 are arranged to face each other with spacing to avoid contacting with each other. The magnet unit 41 and the magnetism detection unit 31 form a multiple-rotation detector 37. On the load side of the base substrate 40, the reflective disc 42 is fixed, and thus the reflective disc 42 and the optical detection unit 32 are arranged to face each other. The reflective disc 42 and the optical detection unit 32 form a rotational position detector 38 (one example of an optical rotational-position detecting sensor).

Because the multiple-rotation detector 37 is disposed at a position further away from the motor body 11 with respect to the rotational position detector 38, as compared with when the multiple-rotation detector 37 is disposed on the motor body 11 side, the leakage flux from the motor body 11 reaching the multiple-rotation detector 37 is weak. Consequently, the resistance characteristics of the multiple-rotation detector 37 to the leakage flux from the motor body 11 can be improved.

Figure 12:
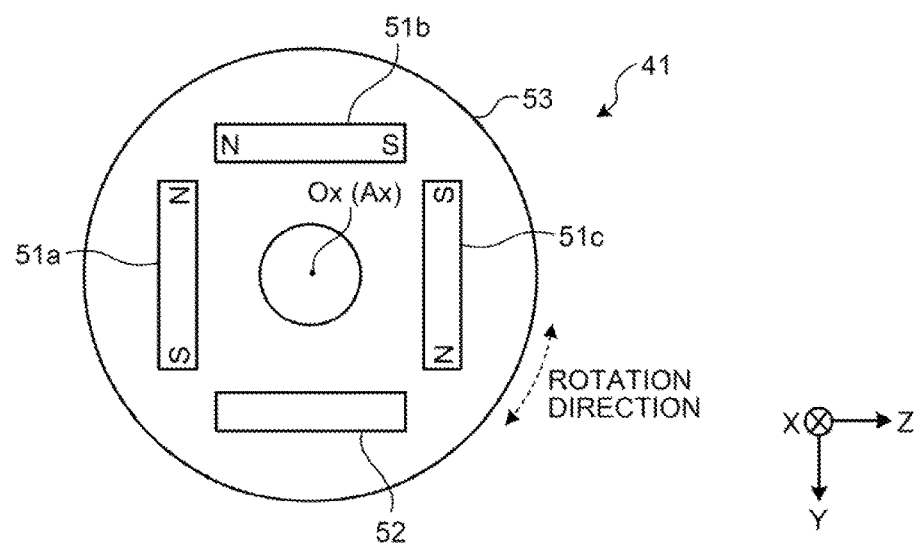
FIG. 12 is a diagram for explaining a magnet unit.

With reference to FIGS. 12 to 15, the following describes the configuration of the multiple-rotation detector 37. With reference to FIG. 12, the configuration of the magnet unit 41 is described first. FIG. 12 is a diagram for explaining the magnet unit 41.

As illustrated in FIG. 12, the magnet unit 41 includes permanent magnets 51a to 51c, a balancing weight 52, and a holding member 53. The holding member 53 is a disc-shaped member, and on the holding member 53, four pieces of recessed portions each housing therein a part of the permanent magnet 51a, 51b, or 51c, or the balancing weight 52 are formed on the principal surface side that is the anti-load side. The four recessed portions are disposed at positions shifted from the rotation axis Ax and rotation symmetric with respect to the rotation axis Ax. The recessed portions house therein the permanent magnets 51a to 51c and the balancing weight 52, and the permanent magnets 51a to 51c and the balancing weight 52 are securely fixed to the recessed portions of the holding member 53 with, for example, adhesive.

The permanent magnets 51a to 51c are disposed at positions shifted from the rotation axis Ax such that the two magnetic poles (N pole and S pole) are line-symmetric to each other with respect to a line orthogonally crossing the rotation axis Ax, and thus the both ends thereof in the long direction are of comparable distance from the rotation axis Ax. The permanent magnets 51a to 51c are formed at positions shifted from the rotation axis Ax and rotation symmetric with respect to the rotation axis Ax. Specifically, with respect to the permanent magnet 51b, the permanent magnets 51a and 51c are located at 90-degree rotation symmetric positions with the rotation axis Ax as the center. The permanent magnet 51b differs from the permanent magnets 51a and 51c in the positions of the N pole and the S pole, and the permanent magnet 51b serves as a set magnet while the permanent magnets 51a and 51c serve as a reset magnet.

At the position 180-degree rotation symmetric to the permanent magnet 51b with the rotation axis Ax as the center, the balancing weight 52 is disposed. The balancing weight 52 has a weight and a shape comparable to the permanent magnets 51a to 51c, thereby enabling the center of gravity position of the magnet unit 41 to be located near the rotation axis Ax. This makes it possible to rotate the magnet unit 41 in a well-balanced manner with respect to the rotation axis Ax.

While the permanent magnets 51a to 51c are columnar with the long direction thereof serving as the direction of axis, they are not limited to such a shape. For example, they may be in a quadrangular prism shape with the long direction thereof serving as the drawing direction, or may be prismatic other than a quadrangular prism shape.

Figure 13:
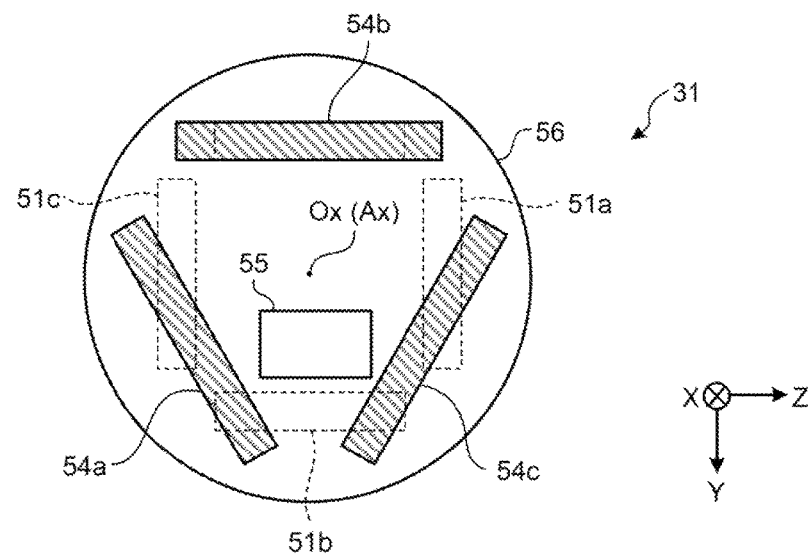
FIG. 13 is a diagram for explaining a magnetism detection unit.

Next, with reference to FIG. 13, the configuration of the magnetism detection unit 31 is described. FIG. 13 is a diagram for explaining the magnetism detection unit 31.

As illustrated in FIG. 13, the magnetism detection unit 31 includes the magnetic field sensors 54a to 54c, a revolution detector 55, and a holding member 56. The holding member 56 is a disc-shaped member, and on the holding member 56, three pieces of recessed portions each housing therein a part of the magnetic field sensor 54a, 54b, or 54c are formed on the load side. The three recessed portions are formed at positions shifted from the rotation axis Ax and rotation symmetric with respect to the rotation axis Ax. On the holding member 56, further formed is a recessed portion housing therein the revolution detector 55.

The magnetic field sensors 54a to 54c are disposed along a plane orthogonal to the rotation axis Ax. Specifically, the magnetic field sensors 54a to 54c are disposed such that the long directions thereof are parallel to a direction orthogonal to the rotation axis Ax and are along the principal surface of the holding member 56. The magnetic field sensors 54a to 54c are formed at positions shifted from the rotation axis Ax and rotation symmetric with respect to the rotation axis Ax. Specifically, with respect to the magnetic field sensor 54b, the magnetic field sensors 54a and 54c are located at 120-degree rotation symmetric positions with the rotation axis Ax as the center. Furthermore, the magnetic field sensors 54a to 54c are disposed such that the both ends of each magnetic wire are line-symmetric to each other with respect to a line orthogonally crossing the rotation axis Ax, and the middle of the magnetic wire in the long direction is closest to the rotation axis Ax and the both ends of the magnetic wire in the long direction are of comparable distance from the rotation axis Ax.

The magnetic field sensors 54a to 54c each include, as with the magnetic field sensor 7, a magnetic wire and a detection coil. When the magnetization reversal in which the magnetic domain walls inside the magnetic body are displaced at one time occurs in the magnetic wire, an induced electromotive force is generated in the detection coil and a pulse signal is output from the detection coil. The configuration of the magnetic field sensors 54a to 54c is the same as that of the magnetic field sensor 7, and thus the explanation thereof is omitted.

The magnetic field sensors 54a to 54c and the permanent magnets 51a to 51c are disposed at positions in which the distances of the respective middles in the long direction from the rotation axis Ax are comparable with one another. Consequently, the magnetic field sensors 54a to 54c are repeatedly positioned at the position to face the permanent magnets 51a to 51c when the rotating body 30 rotates about the rotation axis Ax.

Figure 14:
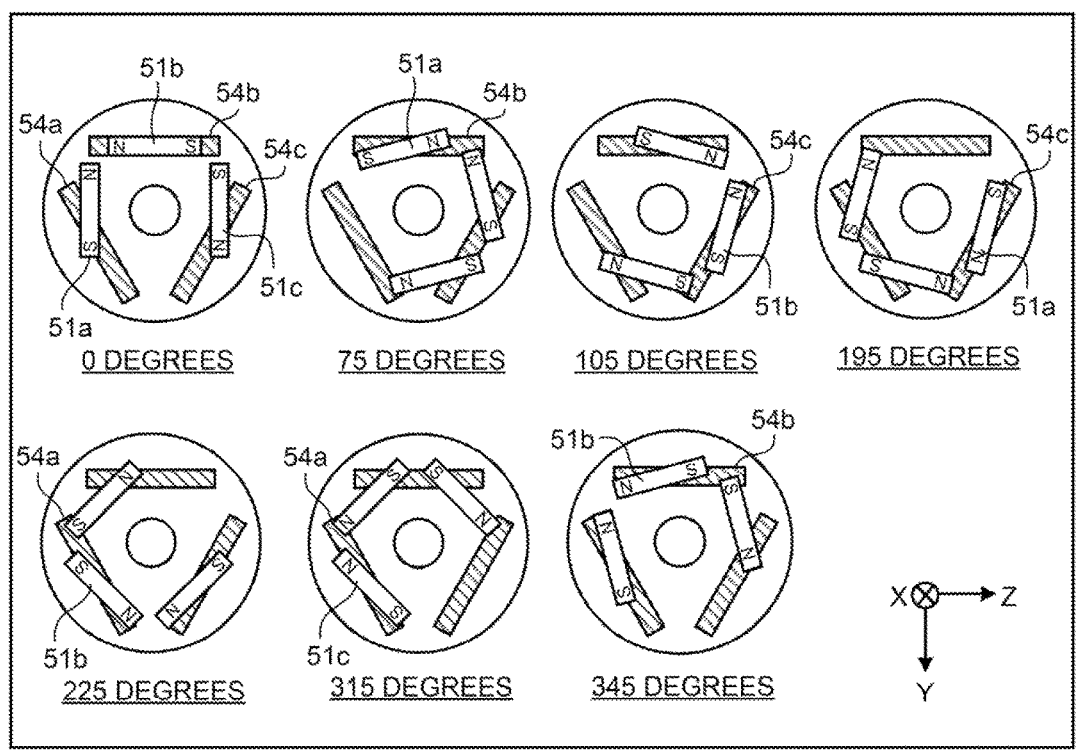
FIG. 14 is a diagram illustrating the positional relation of a magnetic field sensor with respect to permanent magnets.

FIG. 14 is a diagram illustrating the positional relation of the magnetic field sensors 54a to 54c with respect to the permanent magnets 51a to 51c, indicating the situations of the rotating body 30 being rotated by 75 degrees, 105 degrees, 195 degrees, 225 degrees, 315 degrees, and 345 degrees from a prescribed rotational position (0 degrees). It is assumed here that, when the angle of the easy magnetization direction of the magnetic field sensors 54a to 54c with respect to the magnetization direction of the permanent magnets 51a to 51c reaches 15 degrees as viewed from the direction of the rotation axis Ax, the magnetization reversal occurs in which the magnetic domain walls of the magnetic field sensors 54a to 54c are displaced at one time, as one example.

As illustrated in FIG. 14, in a state of the rotational position of the rotating body 30 being at 0 degrees, the magnetic field sensor 54b is in a set state and the magnetic field sensors 54a and 54c are in a reset state. When the rotating body 30 is rotated from such a position by 75 degrees about the rotation axis Ax, the angle between the long direction of the permanent magnet 51a that is the reset magnet and the long direction of the magnetic field sensor 54b reaches 15 degrees as viewed from the direction of the rotation axis Ax. The long direction of the permanent magnet 51a is the magnetization direction of the permanent magnet 51a, and the long direction of the magnetic field sensor 54b is the easy magnetization direction of the magnetic field sensor 54b. As a consequence, the magnetic field sensor 54b is turned into a reset state as the magnetization reversal occurs, and a negative pulse is output from the magnetic field sensor 54b.

When the rotating body 30 subsequently comes to the rotational position of 105 degrees, the angle between the magnetization direction of the permanent magnet 51b that is the set magnet and the easy magnetization direction of the magnetic field sensor 54c reaches 15 degrees. Consequently, the magnetic field sensor 54c is turned into a set state due to the magnetization reversal and a positive pulse is output from the magnetic field sensor 54c. Furthermore, when the rotating body 30 comes to the rotational position of 195 degrees, the angle between the magnetization direction of the permanent magnet 51a and the easy magnetization direction of the magnetic field sensor 54c reaches 15 degrees, and thus the magnetic field sensor 54c is turned into a reset state due to the magnetization reversal and a negative pulse is output from the magnetic field sensor 54c.

When the rotating body 30 comes to the rotational position of 225 degrees, the angle between the magnetization direction of the permanent magnet 51b and the easy magnetization direction of the magnetic field sensor 54a reaches 15 degrees, and thus the magnetic field sensor 54a is turned into a set state due to the magnetization reversal and a positive pulse is output from the magnetic field sensor 54a. Furthermore, when the rotating body 30 comes to the rotational position of 315 degrees, the magnetization direction of the permanent magnet 51c is in the relation of 15 degrees with the easy magnetization direction of the magnetic field sensor 54a, and thus the magnetic field sensor 54a is turned into a reset state due to the magnetization reversal and a negative pulse is output from the magnetic field sensor 54a. When the rotating body 30 comes to the rotational position of 345 degrees, the magnetization direction of the permanent magnet 51b is in the relation of 15 degrees with the easy magnetization direction of the magnetic field sensor 54b, and thus the magnetic field sensor 54b is turned into a set state due to the magnetization reversal and a positive pulse is output from the magnetic field sensor 54b.

As in the foregoing, when the rotating body 30 is rotated in the direction illustrated in FIG. 14 as the direction of rotation, positive pulses are repeatedly output from the magnetic field sensors 54a, 54b, and 54c in that order. On the other hand, when the rotating body 30 is rotated in a reverse direction to the direction illustrated in FIG. 14 as the direction of rotation, positive pulses are repeatedly output from the magnetic field sensors 54c, 54b, and 54a in that order. Consequently, storing the history of which magnetic field sensor out of the three magnetic field sensors 54a to 54c output the positive pulse can determine how the rotating body 30 rotated when the rotating body 30 rotates in either direction.

When two pieces of the magnetic field sensors out of the three magnetic field sensors 54a to 54c are turned into set states, it is not possible to tell from which direction of rotation the rotating body 30 reached the position of the remaining magnetic field sensor. Consequently, in the encoder 12 in the second embodiment, the magnetic field sensors 54a to 54c and the permanent magnets 51a to 51c are disposed in the above-described manner such that only one out of the three magnetic field sensors 54a to 54c is turned into a set state. Furthermore, the magnetic characteristics of the magnetic field sensors 54a to 54c are so set that only one out of the three magnetic field sensors 54a to 54c is turned into a set state by the permanent magnets 51a to 51c.

Figure 15:
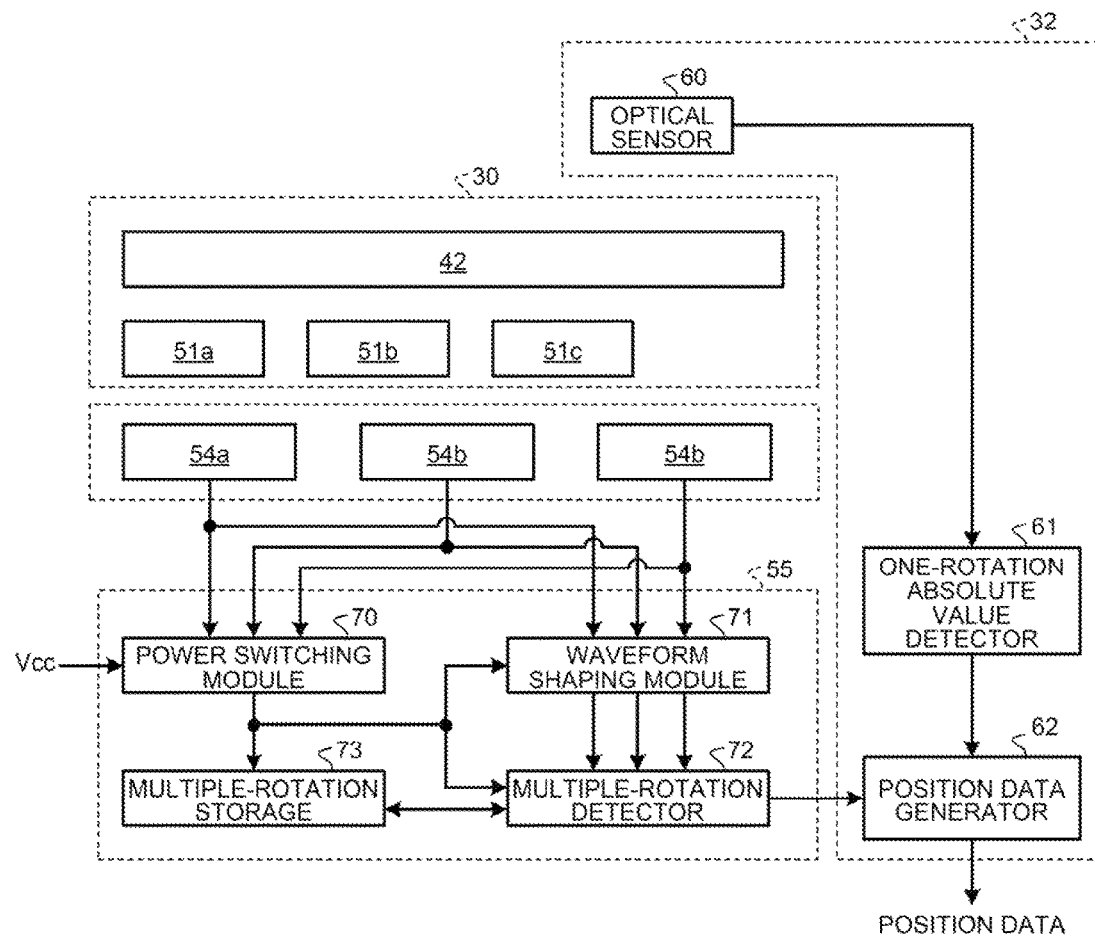
FIG. 15 is a block diagram for explaining an optical detection unit and a revolution detector.
Figure 16:
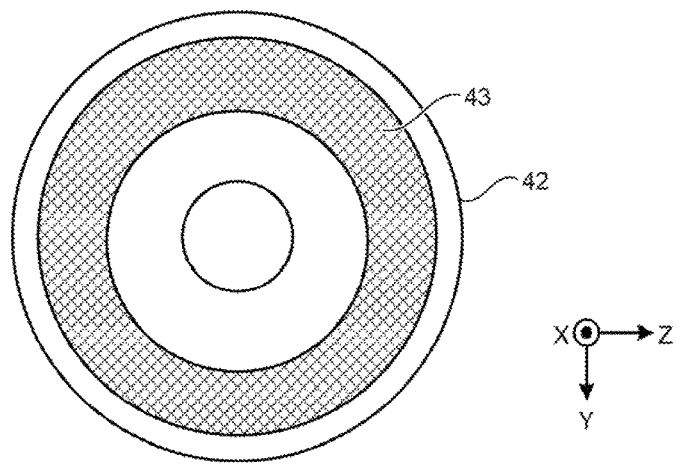
FIG. 16 is a diagram for explaining a reflective disc disposed on a rotating body.

With reference to FIG. 15, the following describes the optical detection unit 32 and the revolution detector 55 in the magnet unit 41. FIG. 15 is a diagram for explaining the optical detection unit 32 and the revolution detector 55, and FIG. 16 is a diagram for explaining the reflective disc 42 disposed on the rotating body 30.

As illustrated in FIG. 15, the optical detection unit 32 includes an optical sensor 60, a one-rotation absolute value detector 61, and a position data generator 62. The optical sensor 60 includes a light-emitting element and a light-receiving element, and the light-emitting element emits light to the reflective disc 42 of the rotating body 30. As illustrated in FIG. 16, on the reflective disc 42, a slit array 43 having a plurality of reflective slits is formed as a reflective pattern, and the optical sensor 60 receives the light reflected from the slit array 43 by the light-receiving element and outputs a signal in response to a light-receiving state.

The reflective slits that the slit array 43 has are disposed on the whole circumference of the reflective disc 42 so as to have an absolute pattern in the circumferential direction of the reflective disc 42. The absolute pattern is a pattern by which the position, ratio, and others of the reflective slits within the angle that the light-receiving element of the optical detection unit 32 faces are unambiguously defined within one rotation of the reflective disc 42. The optical sensor 60 receives the light that is emitted to the reflective disc 42 and reflected from the reflective slits of the reflective disc 42, and outputs a signal corresponding to the position of the reflective disc 42 in the circumferential direction. The one-rotation absolute value detector 61 detects an absolute position (rotational position) of the rotating body 30 based on the signal output from the optical sensor 60, and outputs the information on the absolute position of the rotating body 30 to the position data generator 62.

The position data generator 62 acquires the information on the absolute position of the rotating body 30 output from the one-rotation absolute value detector 61 and the information on the number of revolutions of the rotating body 30 output from the revolution detector 55. The position data generator 62 then calculates, based on the signals acquired, the rotation amount x of the motor body 11 represented by the signals, and outputs the position data representing the rotation amount x to the controller 20. The rotation amount x here includes the number of revolutions of the rotating body 30 and the information on the absolute position of the rotating body 30.

When the power-supply voltage Vcc is supplied from the outside, the position data generator 62 can further calculate the rotation amount x of the motor body 11 based only on the information on the absolute position of the rotating body 30 output from the one-rotation absolute value detector 61. Meanwhile, when the power-supply voltage Vcc from the outside is once stopped and the supply of the power-supply voltage Vcc from the outside is resumed, the position data generator 62 calculates the rotation amount x of the motor body 11 based on the information on the absolute position of the rotating body 30 output from the one-rotation absolute value detector 61 and the information on the number of revolutions of the rotating body 30 output from the revolution detector 55. The revolution detector 55 can self-generate the power it consumes even when the power-supply voltage Vcc is not supplied from the outside as described in the following, and thus a backup power source (for example, a battery) can be omitted.

The revolution detector 55 includes a power switching module 70, a waveform shaping module 71, a multiple-rotation detector 72, and a multiple-rotation storage 73. The revolution detector 55, as described later, is able to detect the number of revolutions of the rotating body 30 based on the power derived from the positive pulses output from the magnetic field sensors 54a to 54c even when the power-supply voltage Vcc is not supplied from the outside.

The power switching module 70 supplies the power-supply voltage Vcc to the waveform shaping module 71, the multiple-rotation detector 72, and the multiple-rotation storage 73 when the power-supply voltage Vcc is supplied from the outside. Meanwhile, when the power-supply voltage Vcc is not supplied from the outside, the power switching module 70 supplies a voltage generated from the positive pulses output from the magnetic field sensors 54a to 54c to the waveform shaping module 71, the multiple-rotation detector 72, and the multiple-rotation storage 73. While the negative pulses output from the magnetic field sensors 54a to 54c are in negative polarity and are not used for the voltage generation, the negative pulses can be used for voltage generation with a full-wave rectifier or the like.

The waveform shaping module 71 converts the respective positive pulses output from the magnetic field sensors 54a to 54c into square-wave pulses, and outputs the square-wave pulses to the multiple-rotation detector 72. The multiple-rotation detector 72 detects the number of revolutions of the rotating body 30 based on the pulses output from the waveform shaping module 71.

Specifically, the multiple-rotation detector 72 determines which magnetic field sensor out of the magnetic field sensors 54a to 54c output the positive pulse that caused the pulse output from the waveform shaping module 71, and stores the result in the multiple-rotation storage 73. For example, the multiple-rotation detector 72 stores, in the multiple-rotation storage 73, the data of 00 when the pulse corresponds to the magnetic field sensor 54a, the data of 01 when the pulse corresponds to the magnetic field sensor 54b, and the data of 10 when the pulse corresponds to the magnetic field sensor 54c. The multiple-rotation detector 72 then detects the number of revolutions of the rotating body 30 based on the data stored in the multiple-rotation storage 73.

The multiple-rotation detector 72 is not able to detect the revolution accurately with the rotational position of the rotating body 30 alone. The multiple-rotation detector 72 thus outputs the number of revolutions of the rotating body 30 detected and the data stored in the multiple-rotation storage 73 to the position data generator 62. The position data generator 62 calculates the rotation amount x of the motor body 11 by correcting the number of revolutions of the rotating body 30 based on the absolute position of the rotating body 30 and the data stored in the multiple-rotation storage 73. The multiple-rotation detector 72 may be configured to send the data stored in the multiple-rotation storage 73 to the position data generator 62 without detecting the number of revolutions of the rotating body 30. In this case, the position data generator 62 calculates the number of revolutions of the rotating body 30 based on the data stored in the multiple-rotation storage 73 and the absolute position of the rotating body 30.

As in the foregoing, in the motor 10 in the second embodiment, the magnetic field sensors 54a to 54c each including the magnetic body of a large Barkhausen effect are disposed in the encoder 12. Consequently, even when the shaft 13 of the motor 10 rotates while the power-supply voltage Vcc is not supplied, for example, the number of revolutions of the shaft 13 can be detected by the encoder 12.

In the encoder 12, the magnetic field sensors 54a to 54c and the permanent magnets 51a to 51c are disposed being spaced with respect to the rotation axis Ax that is the center line of revolution. Furthermore, the magnetization direction of the permanent magnets 51a to 51c and the easy magnetization direction of the magnetic field sensors 54a to 54c are in parallel with a direction orthogonal to the rotation axis Ax. Consequently, the directions of leakage flux from the motor body 11 are skewed with respect to the easy magnetization direction of the magnetic field sensors 54a to 54c, and thus the magnetic field sensors 54a to 54c are insusceptible to the leakage flux from the motor body 11. This allows the distance between the magnetic field sensors 54a to 54c and the motor body 11 to be made small, for example, and thus the downsizing of the encoder 12 and the motor 10 can be achieved.

Furthermore, the magnetic field sensors 54a to 54c are disposed such that the magnetic wires are line-symmetric with respect to a line orthogonally crossing the rotation axis Ax and the both ends of the magnetic wires in the long direction are of comparable distance from the rotation axis Ax. Consequently, the directions of the leakage flux from the motor body 11 are symmetric on both sides of the magnetic field sensors 54a to 54c with the middle portion thereof in the long direction as the center. This makes the magnetic field sensors 54a to 54c further insusceptible to the leakage flux from the motor body 11, and thus further downsizing of the encoder 12 and the motor 10 can be achieved.

In the encoder 12, the long directions of the permanent magnets 51a to 51c are defined as the magnetization direction and the long directions of the magnetic field sensors 54a to 54c are defined as the easy magnetization direction. The long directions of the permanent magnets 51a to 51c and the long directions of the magnetic field sensors 54a to 54c are in parallel with a direction orthogonal to the rotation axis Ax, and thus the long directions of the permanent magnets 51a to 51c and the long directions of the magnetic field sensors 54a to 54c are disposed along a plane orthogonal to the rotation center line of the rotating body 30. Consequently, the short directions of the permanent magnets 51a to 51c and the short directions of the magnetic field sensors 54a to 54c are in the direction of the rotation axis Ax, and thus the length of the encoder 12 in the direction of the rotation axis Ax can be reduced. This can also achieve the downsizing of the encoder 12 and the motor 10.

The encoder 12 detects a one-rotation absolute value optically, and thus is able to detect the one-rotation absolute value accurately without being affected by the leakage flux from the motor body 11.

Furthermore, providing the magnetic field sensors 54a to 54c makes MR elements and Hall elements unnecessary to be mounted on a circuit board for the detection of multiple revolution. This makes it unnecessary to secure the mounting space thereof on the circuit board, whereby the space of the circuit board can be saved and the degree of freedom in design can be enhanced.

In the encoder 12, the multiple-rotation detector 37 is formed on one side of the rotating body 30, and on the opposite side, the rotational position detector 38 is formed. This permits the rotating body 30 to be shared for the multiple-rotation detection and for the rotational position detection, and thus space saving and downsizing can be achieved. In addition, the base substrate 40 of the rotating body 30 can isolate the multiple-rotation detector 37 from the rotational position detector 38, and thus the influence of the magnetic flux from the permanent magnets 51a to 51c to the optical detection unit 32 and other circuits can be reduced.

The multiple-rotation storage 73 that stores therein the detection results of the magnetic field sensors 54a to 54c is disposed adjacent to the magnetic field sensors 54a to 54c, and this reduces the power required when the detection results of the magnetic field sensors 54a to 54c are delivered. The power switching module 70 is also disposed adjacent to the magnetic field sensors 54a to 54c, and thus the power supply from the magnetic field sensors 54a to 54c can be performed efficiently.

While the permanent magnets 51a to 51c and the magnetic field sensors 54a to 54c are faced to each other in the direction of the rotation axis Ax in the second embodiment, they are not limited to such a positional relation. For example, as in the first embodiment (see FIG. 9), the magnetic field sensors 54a to 54c can be disposed in a direction orthogonal to the rotation axis Ax with respect to the permanent magnets 51a to 51c.

Third Embodiment

The following describes a motor according to a third embodiment. The motor in the third embodiment differs from the motor 10 in the second embodiment in the placement of magnetic field sensors in a magnetism detection unit and the placement of permanent magnets in a magnet unit. In the following description, the placement of the magnetic field sensors in the magnetism detection unit and the placement of the permanent magnets in the magnet unit will be explained specifically. The constituent elements corresponding to those in the second embodiment will bear the same reference numerals or symbols, and the explanation redundant to that in the second embodiment will be omitted as appropriate.

Figure 17:
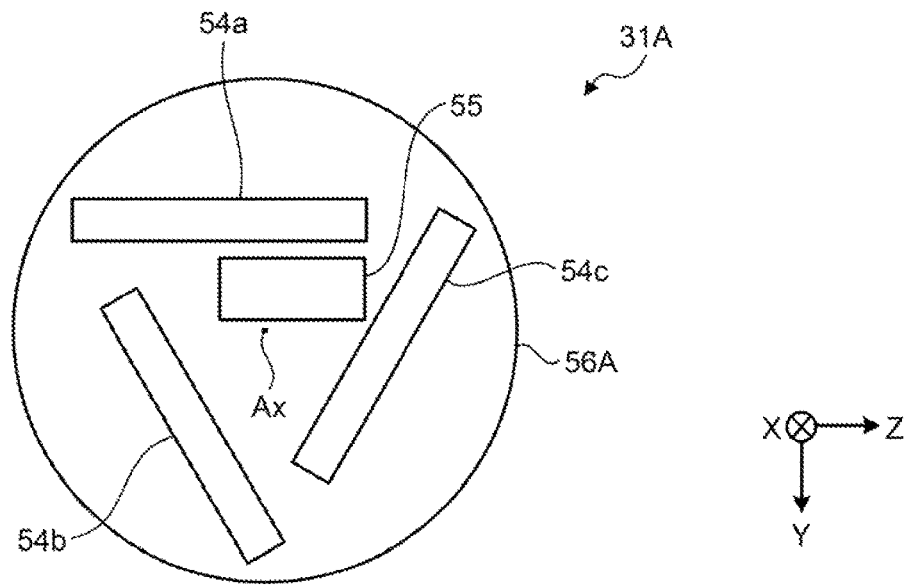
FIG. 17 is a diagram for explaining the magnetism detection unit in the third embodiment.

With reference to FIG. 17, the placement of the magnetic field sensors in the magnetism detection unit is described first. FIG. 17 is a diagram for explaining the magnetism detection unit in the third embodiment. As illustrated in FIG. 17, on a holding member 56A of a magnetism detection unit 31A, three pieces of recessed portions each housing therein a part of the magnetic field sensor 54a, 54b, or 54c are formed on the load side. The three recessed portions are formed at positions shifted from the rotation axis Ax and rotation symmetric with respect to the rotation axis Ax.

The magnetic field sensors 54a to 54c are disposed along a plane orthogonal to the rotation center line of the rotating body 30 that is orthogonal to the rotation axis Ax. Specifically, the magnetic field sensors 54a to 54c are disposed such that the long directions thereof are parallel to the direction orthogonal to the rotation axis Ax and are along the principal surface of the holding member 56A. The magnetic field sensors 54a to 54c are disposed at positions shifted from the rotation axis Ax and rotation symmetric with respect to the rotation axis Ax by the recessed portions formed on the holding member 56A. Specifically, with respect to the magnetic field sensor 54b, the magnetic field sensors 54a and 54c are located at 120-degree rotation symmetric positions with the rotation axis Ax as the center.

Furthermore, the magnetic field sensors 54a to 54c are disposed at positions in which the magnetic wires are disposed to be asymmetric to one another with respect to a line orthogonally crossing the rotation axis Ax and one end of each magnetic wire in the long direction is closer to the rotation axis Ax than the other end. Disposing the magnetic field sensors 54a to 54c in this manner, as compared with the magnetism detection unit 31 in the second embodiment, can reduce the area surrounded by the magnetic field sensors 54a to 54c. Consequently, the magnetism detection unit 31A in the third embodiment can achieve downsizing as compared with the magnetism detection unit 31 in the second embodiment.

Figure 18:
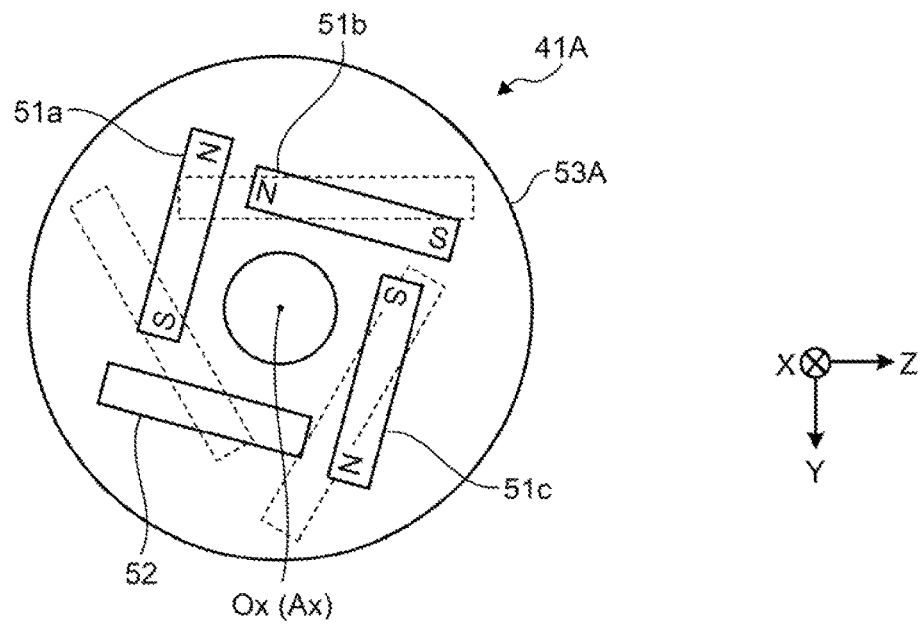
FIG. 18 is a diagram for explaining a magnet unit in the third embodiment.

Next, with reference to FIG. 18, the placement of the permanent magnets in the magnet unit is described. FIG. 18 is a diagram for explaining the magnet unit in the third embodiment. As illustrated in FIG. 18, on a holding member 53A of a magnet unit 41A, four pieces of recessed portions each housing therein a part of the permanent magnets 51a to 51c or the balancing weight 52 are formed on the principal surface side that is the anti-load side. The four recessed portions are disposed at positions shifted from the rotation axis Ax and rotation symmetric with respect to the rotation axis Ax.

The permanent magnets 51a to 51c are disposed by the recessed portions formed on the holding member 53A, similarly to the magnetic field sensors 54a to 54c, at positions in which the magnetic wires are disposed such that the two magnetic poles are asymmetric to each other with respect to a line orthogonally crossing the rotation axis Ax and one end of the magnetic wires in the long direction is closer to the rotation axis Ax than the other end. Furthermore, with respect to the permanent magnet 51b, the permanent magnets 51a and 51c are located at 90-degree rotation symmetric positions with the rotation axis Ax as the center.

The magnetic field sensors 54a to 54c and the permanent magnets 51a to 51c are disposed at positions in which the distances of the respective middles in the long direction thereof from the rotation axis Ax are comparable. Consequently, the magnetic field sensors 54a to 54c are repeatedly positioned at the position to face the permanent magnets 51a to 51c when the rotating body 30 rotates about the rotation axis Ax.

Furthermore, at the position 180-degree rotation symmetric to the permanent magnet 51b with the rotation axis Ax as the center, the balancing weight 52 is disposed. The balancing weight 52 has a weight and a shape comparable to the permanent magnets 51a to 51c, thereby enabling the center of gravity position of the magnet unit 41A to be located near the rotation axis Ax. This makes it possible to rotate the magnet unit 41A in a well-balanced manner with respect to the rotation axis Ax.

As in the foregoing, in the encoder of the motor in the third embodiment, the magnetic field sensors 54a to 54c and the permanent magnets 51a to 51c are disposed to be asymmetric with respect to a line orthogonally crossing the rotation axis Ax. Consequently, the size of the area surrounded by the magnetic field sensors 54a to 54c and the size of the area surrounded by the permanent magnets 51a to 51c can be reduced, and as a result, the downsizing of the encoder and the motor can be achieved.

Fourth Embodiment

The following describes a motor according to a fourth embodiment. The motor in the fourth embodiment differs from the motor 10 in the second embodiment in the shape of permanent magnets in a magnet unit. In the following description, the shape of the permanent magnets in the magnet unit is explained specifically. Furthermore, the constituent elements corresponding to those in the second embodiment will bear the same reference numerals or symbols, and the explanation redundant to that in the second embodiment will be omitted as appropriate.

Figure 19:
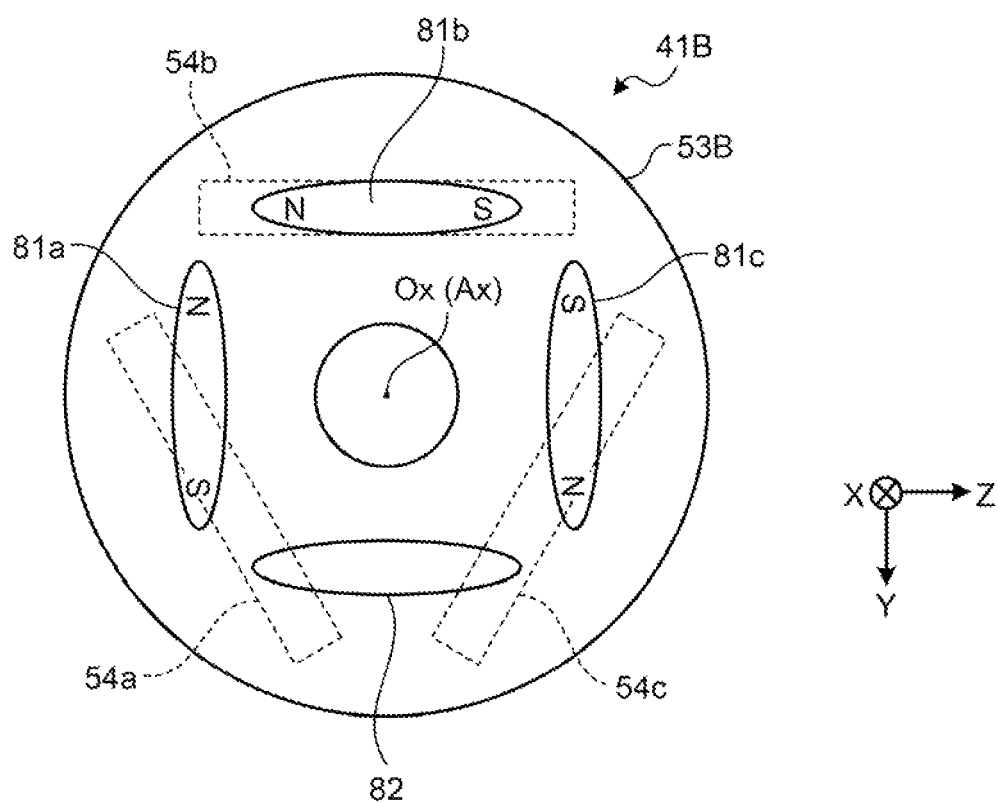
FIG. 19 is a diagram for explaining the shape of permanent magnets according to a fourth embodiment.

With reference to FIG. 19, the shape of the permanent magnets in the fourth embodiment is described. FIG. 19 is a diagram for explaining the shape of the permanent magnets in the fourth embodiment. As illustrated in FIG. 19, on a holding member 53B of a magnet unit 41B, four pieces of recessed portions each housing therein a part of permanent magnets 81a to 81c or a balancing weight 82 are formed on the principal surface side that is the anti-load side. The four recessed portions are disposed at positions shifted from the rotation axis Ax and rotation symmetric with respect to the rotation axis Ax.

The permanent magnets 81a to 81c are formed in an elliptical shape tapered in the long direction as viewed from the direction facing the magnetic field sensors 54a to 54c, more specifically, the axial direction of the rotation axis Ax. Forming the permanent magnets 81a to 81c in such a shape can make the magnetization change that arises on the magnetic field sensors 54a to 54c abrupt. Consequently, the precision of the position detection by the magnetic field sensors 54a to 54c can be improved.

Furthermore, at the position 180-degree rotation symmetric to the permanent magnet 81b with the rotation axis Ax as the center, the balancing weight 82 is disposed. The balancing weight 82 has a weight and a shape comparable to the permanent magnets 81a to 81c, thereby enabling the center of gravity position of the magnet unit 41B to be located near the rotation axis Ax. This makes it possible to rotate the magnet unit 41B in a well-balanced manner with respect to the rotation axis Ax.

As in the foregoing, the motor in the fourth embodiment can improve the precision of the position detection by the magnetic field sensors 54a to 54c. While the change in the shape of the permanent magnets of the motor 10 in the second embodiment is exemplified in the example illustrated in FIG. 19, it is not limited to this. For example, the shape of the permanent magnets of the motor 1 in the first embodiment may be formed in the elliptical shape illustrated in FIG. 19, or the shape of the permanent magnets of the motor in the third embodiment may be formed in the elliptical shape illustrated in FIG. 19.

Further effects and modifications can be derived easily by those skilled in the art. Thus, a broader aspect of the present invention is not limited to the specific details and representative embodiments as expressed and described above. Therefore, various changes can be made without departing from the spirit and scope of the concept of the comprehensive invention defined by the accompanying claims and the equivalents thereof.

For example, in the first embodiment, the encoder 3 may be configured to detect the rotational position (a rotation angle within one rotation) of the shaft 4 in addition to the number of revolutions of the shaft 4. In this case, the rotational position of the shaft 4 is detected, for example, by an optical encoder.

While the encoder structured with two permanent magnets and one magnetic field sensor and the encoder structured with three permanent magnets and three magnetic field sensors are explained in the above-described embodiments, it is not limited to these. For example, the encoder may be structured with three permanent magnets and magnetic field sensors of four or more, or the encoder may be structured with permanent magnets of four or more and magnetic field sensors of three or more.

Furthermore, while the encoder is arranged to be adjacent to the rotor 19 and the stator 18 via the bracket 16 in the above-described motor, it is not limited to this. For example, a brake that fixes the shaft 13 when the power supply is stopped may be disposed between the rotor 19 and the bracket 16 and between the stator 18 and the bracket 16. Although the magnetic field from the brake is also generated when the brake is an electromagnetic brake, the above-described motor can reduce the influence of the magnetic field from the brake even in such a case.

While a single magnetic wire is disposed in the above-described magnetic field sensor, the magnetic wire may be two or more. Structuring the magnetic field sensor with two or more magnetic wires can increase the power generated by the magnetic field sensor.

While the positive pulses output from the magnetic field sensor are used to count the revolution in the above-described encoders, it is not limited to this. For example, the negative pulses output from the magnetic field sensor may be used to count the revolution, or the positive pulses and the negative pulses output from the magnetic field sensor may be used to count the revolution.

While the permanent magnets and the magnetic field sensors are exemplified to be placed in the recessed portions in the above-described encoders, the placement is not limited to the recessed portions and the permanent magnets and the magnetic field sensors may be placed on a flat surface or on projecting portions, for example.

The invention claimed is:

1. A motor comprising:
a motor body configured to rotate a shaft about an axis line thereof;
a rotating body that includes a first permanent magnet and a second permanent magnet, the rotating body rotates along with the rotation of the shaft, the rotating body having a disc shape;
at least one magnetic field sensor that includes a magnetic body having a large Barkhausen effect with a long direction thereof serving as an easy magnetization direction, the easy magnetization direction of the magnetic body being in a direction along a plane orthogonal to a rotation center line of the rotating body; and
an optical rotational-position detecting sensor configured to detect a rotational position of the rotating body, the optical rotational-position detecting sensor comprising:
a reflective pattern formed on a first surface of the rotating body, the first surface being opposite to a second surface on which the first permanent magnet and the second permanent magnet are disposed; and
an optical sensor configured to emit light to the reflective pattern and receive light reflected by the reflective pattern,
wherein the magnetic field sensor includes a detection coil,
wherein the magnetic field sensor is positioned at a position distant from the rotation center line, the magnetic field sensor is disposed such that the long direction of the magnetic body is line symmetric with respect to a line orthogonally crossing the rotation center line,
wherein each of the first permanent magnet and the second permanent magnet has an S pole and an N pole, the S pole and the N pole are disposed on the second surface of the rotating body perpendicular to the rotation center line, each of the first permanent magnet and the second permanent magnet is disposed such that the N pole and the S pole are line symmetric with respect to a line orthogonally crossing the rotation center line,
wherein the magnetic body has a first end and a second end opposite to the first end in the long direction of the magnetic body,
wherein the first end and the second end are positioned to face the N pole and the S pole of the first permanent magnet, respectively, when the rotational position of the rotating body is at a first given rotational position,
wherein the first end and the second end are positioned to face the S pole and the N pole of the second permanent magnet, respectively, when the rotational position of the rotating body is at a second given rotational position, and
wherein a positive pulse and negative pulse are respectively output from the detection coil when the rotational position of the rotating body is at the first given rotational position and at the second given rotational position.

2. The motor according to claim 1, wherein the reflective pattern is disposed closer to the motor body than the first permanent magnet and the second permanent magnet.

3. The motor according to claim 1, further comprising:
a storage configured to store therein a detection result of the magnetic field sensor, the storage being disposed adjacent to the magnetic field sensor; and
a detector configured to detect number of revolutions of the rotating body based on information stored in the storage.

4. The motor according to claim 1, wherein the magnetic field sensor is provided in plurality.

5. The motor according to claim 4, wherein the magnetic field sensors are disposed to be rotation symmetric to one another with respect to the rotation center line.

6. The motor according to claim 1, further comprising a back yoke disposed in peripheries of the rotating body and the magnetic field sensor.

7. The motor according to claim 1,
wherein the magnetic field sensor is spaced apart from the rotation center line, and
wherein the first permanent magnet and the second permanent magnet are spaced apart from the rotation center line.

8. The motor according to claim 1,
wherein each of the first permanent magnet and the second permanent magnet has an elongated shape with a first end and a second end opposite to the first end in a long direction of the elongated shape, and
wherein the long direction of the elongated shape extends in a direction orthogonal to the line orthogonally crossing the rotation center line.

9. A motor system comprising:
a motor body configured to rotate a shaft about an axis line thereof;
an encoder configured to detect rotation of the shaft; and
a controller configured to control the motor body based on a detection result of the encoder,
the encoder comprising:
 a rotating body that includes a first permanent magnet and a second permanent magnet, the rotating body rotates along with the rotation of the shaft, the rotating body having a disc shape;
 at least one magnetic field sensor that includes a magnetic body having a large Barkhausen effect with a long direction thereof serving as an easy magnetization direction, the easy magnetization direction of the magnetic body being in a direction along a plane orthogonal to a rotation center line of the rotating body; and
an optical rotational-position detecting sensor configured to detect a rotational position of the rotating body, the optical rotational-position detecting sensor comprising:
 a reflective pattern formed on a first surface of the rotating body, the first surface being opposite to a second surface on which the first permanent magnet and the second permanent magnet are disposed; and
 an optical sensor configured to emit light to the reflective pattern and receive light reflected by the reflective pattern,
wherein the magnetic field sensor includes a detection coil,
wherein the magnetic field sensor is positioned at a position distant from the rotation center line, the magnetic field sensor is disposed such that the long direction of the magnetic body is line symmetric with respect to a line orthogonally crossing the rotation center line,
wherein each of the first permanent magnet and the second permanent magnet has an S pole and an N pole, the S pole and the N pole are disposed on the second surface of the rotating body perpendicular to the rotation center line, each of the first permanent magnet and the second permanent magnet is disposed such that the N pole and the S pole are line symmetric with respect to a line orthogonally crossing the rotation center line,
wherein the magnetic body has a first end and a second end opposite to the first end in the long direction of the magnetic body,
wherein the first end and the second end are positioned to face the N pole and the S pole of the first permanent magnet, respectively, when the rotational position of the rotating body is at a first given rotational position,
wherein the first end and the second end are positioned to face the S pole and the N pole of the second permanent magnet, respectively, when the rotational position of the rotating body is at a second given rotational position, and
wherein a positive pulse and negative pulse are respectively output from the detection coil when the rotational position of the rotating body is at the first given rotational position and at the second given rotational position.

10. The motor system according to claim 9,
wherein the magnetic field sensor is spaced apart from the rotation center line, and
wherein the first permanent magnet and the second permanent magnet are spaced apart from the rotation center line.

11. The motor system according to claim 9,
wherein each of the first permanent magnet and the second permanent magnet has an elongated shape with a first end and a second end opposite to the first end in a long direction of the elongated shape, and
wherein the long direction of the elongated shape extends in a direction orthogonal to the line orthogonally crossing the rotation center line.

12. A motor encoder comprising:
a rotating body that includes a first permanent magnet and a second permanent magnet, the rotating body has a disc shape;
at least one magnetic field sensor that includes a magnetic body having a large Barkhausen effect with a long direction thereof serving as an easy magnetization direction, the easy magnetization direction of the magnetic body being in a direction along a plane orthogonal to a rotation center line of the rotating body; and
an optical rotational-position detecting sensor configured to detect a rotational position of the rotating body, the optical rotational-position detecting sensor comprising:
 a reflective pattern formed on a first surface of the rotating body, the first surface being opposite to a second surface on which the first permanent magnet and the second permanent magnet are disposed; and
 an optical sensor configured to emit light to the reflective pattern and receive light reflected by the reflective pattern,
wherein the magnetic field sensor includes a detection coil,
wherein the magnetic field sensor is positioned at a position distant from the rotation center line, the magnetic field sensor is disposed such that the long direction of the magnetic body is line symmetric with respect to a line orthogonally crossing the rotation center line,
wherein each of the first permanent magnet and the second permanent magnet has an S pole and an N pole, the S pole and the N pole are disposed on the second surface of the rotating body perpendicular to the rotation center line, each of the first permanent magnet and the second permanent magnet is disposed such that the N pole and the S pole are line symmetric with respect to a line orthogonally crossing the rotation center line,
wherein the magnetic body has a first end and a second end opposite to the first end in the long direction of the magnetic body,
wherein the first end and the second end are positioned to face the N pole and the S pole of the first permanent magnet, respectively, when the rotational position of the rotating body is at a first given rotational position,
wherein the first end and the second end are positioned to face the S pole and the N pole of the second permanent magnet, respectively, when the rotational position of the rotating body is at a second given rotational position, and
wherein a positive pulse and negative pulse are respectively output from the detection coil when the rotational position of the rotating body is at the first given rotational position and at the second given rotational position.

13. The motor encoder according to claim 12,
wherein the magnetic field sensor is spaced apart from the rotation center line, and
wherein the first permanent magnet and the second permanent magnet are spaced apart from the rotation center line.

14. The motor encoder according to claim 12,
wherein each of the first permanent magnet and the second permanent magnet has an elongated shape with a first end and a second end opposite to the first end in a long direction of the elongated shape, and
wherein the long direction of the elongated shape extends in a direction orthogonal to the line orthogonally crossing the rotation center line.

* * * * *